(12) United States Patent
Wnuk et al.

(10) Patent No.: US 11,801,463 B2
(45) Date of Patent: Oct. 31, 2023

(54) FILTER APPARATUS

(71) Applicant: HYDAC PROCESS TECHNOLOGY GMBH, Neunkirchen (DE)

(72) Inventors: Ralf Wnuk, Bexbach/Kleinottweiler (DE); Thomas Boettcher, Illingen-Huettigweiler (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 635 days.

(21) Appl. No.: 16/480,376

(22) PCT Filed: Apr. 27, 2018

(86) PCT No.: PCT/EP2018/060864
§ 371 (c)(1),
(2) Date: Jul. 24, 2019

(87) PCT Pub. No.: WO2018/206315
PCT Pub. Date: Nov. 15, 2018

(65) Prior Publication Data
US 2019/0381429 A1 Dec. 19, 2019

(30) Foreign Application Priority Data
May 8, 2017 (DE) .................... 10 2017 004 661.1

(51) Int. Cl.
*B01D 29/66* (2006.01)
*B01D 29/25* (2006.01)
*B01D 29/52* (2006.01)

(52) U.S. Cl.
CPC ........... *B01D 29/668* (2013.01); *B01D 29/25* (2013.01); *B01D 29/52* (2013.01);
(Continued)

(58) Field of Classification Search
CPC ................ B01D 29/668; B01D 29/682; B01D 2201/08; B01D 2201/086
(Continued)

(56) References Cited

U.S. PATENT DOCUMENTS

| 4,636,311 | A * | 1/1987 | Litzenburger | ....... B01D 29/117 |
| | | | | 210/323.2 |
| 10,052,574 | B2 * | 8/2018 | Takahashi | .............. B01D 29/52 |

(Continued)

FOREIGN PATENT DOCUMENTS

| CA | 2 892 583 | 5/2014 |
| DE | 10 2011 111 457 | 2/2013 |

(Continued)

OTHER PUBLICATIONS

International Search Report (ISR) dated Aug. 13, 2018 in International (PCT) Application No. PCT/EP2018/060864.

*Primary Examiner* — Benjamin M Kurtz
(74) *Attorney, Agent, or Firm* — WENDEROTH, LIND & PONACK, L.L.P.

(57) ABSTRACT

A filter apparatus (10) has a plurality of filter elements (20) in a filter housing (12) having a filter inlet (50) for a fluid to be filtered and a filter outlet (52) for the filtered fluid. A pressure control device (42) has at least one control plate (58) located inside a connection chamber (14). The control plate laterally passes over individual upper element openings (54) of the filter element to be backwashed (20), in a predefinable sequence, covering the opening to an increasing degree and then exposing the opening again. A discharge opening (46) of the backwash device (44) is, at least in part, fluidically connected to a lower element opening (56) of the filter element (20) to be backwashed, as the pressure control device (42) moves towards the upper element opening (54).

9 Claims, 7 Drawing Sheets

(52) U.S. Cl.
CPC ............... *B01D 2201/0453* (2013.01); *B01D 2201/086* (2013.01); *B01D 2201/16* (2013.01); *B01D 2201/325* (2013.01)

(58) Field of Classification Search
USPC ......... 210/333.01, 333.1, 411, 412, 425, 427
See application file for complete search history.

(56) References Cited

U.S. PATENT DOCUMENTS

| | | | |
|---|---|---|---|
| 10,918,980 B2 * | 2/2021 | Takahashi | B01D 46/0067 |
| 2014/0144830 A1 * | 5/2014 | Isch | B01D 29/52 |
| | | | 210/323.2 |
| 2014/0183110 A1 * | 7/2014 | Schlichter | B01D 29/68 |
| | | | 210/108 |

FOREIGN PATENT DOCUMENTS

| | | | |
|---|---|---|---|
| DE | 20 2012 100 368 | | 5/2013 |
| JP | 2014-34029 | | 2/2014 |
| RU | 2 082 484 | | 6/1997 |
| WO | WO 2013/114329 | * | 8/2013 |
| WO | WO 2015/114812 | * | 8/2015 |

* cited by examiner

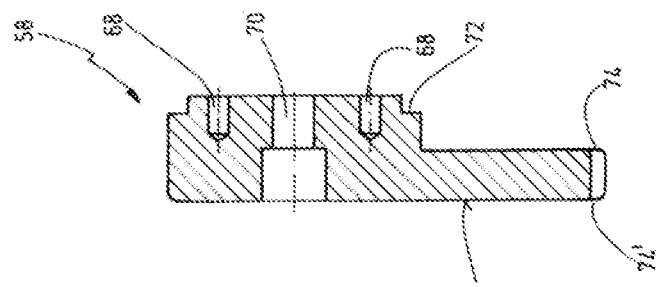
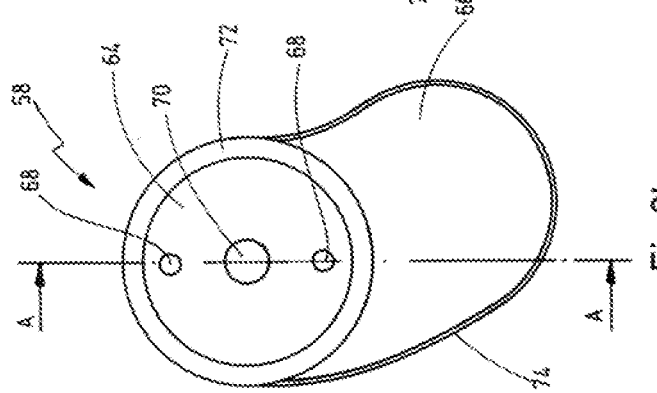
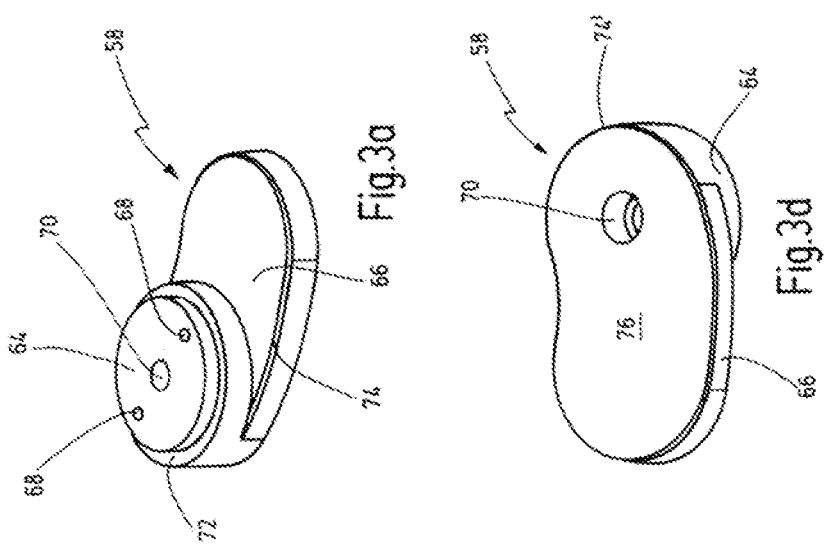

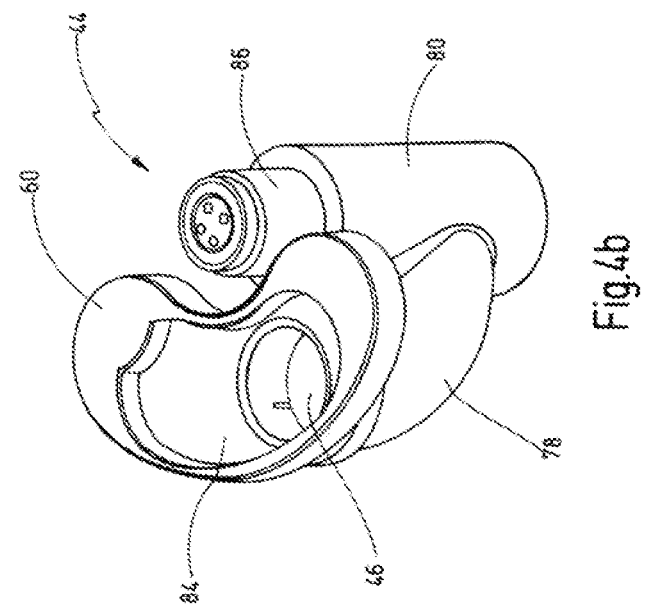
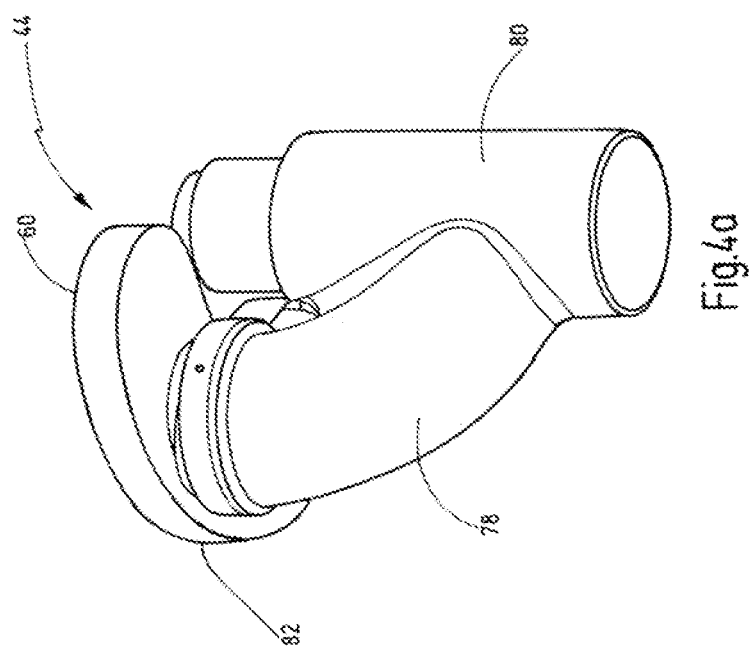

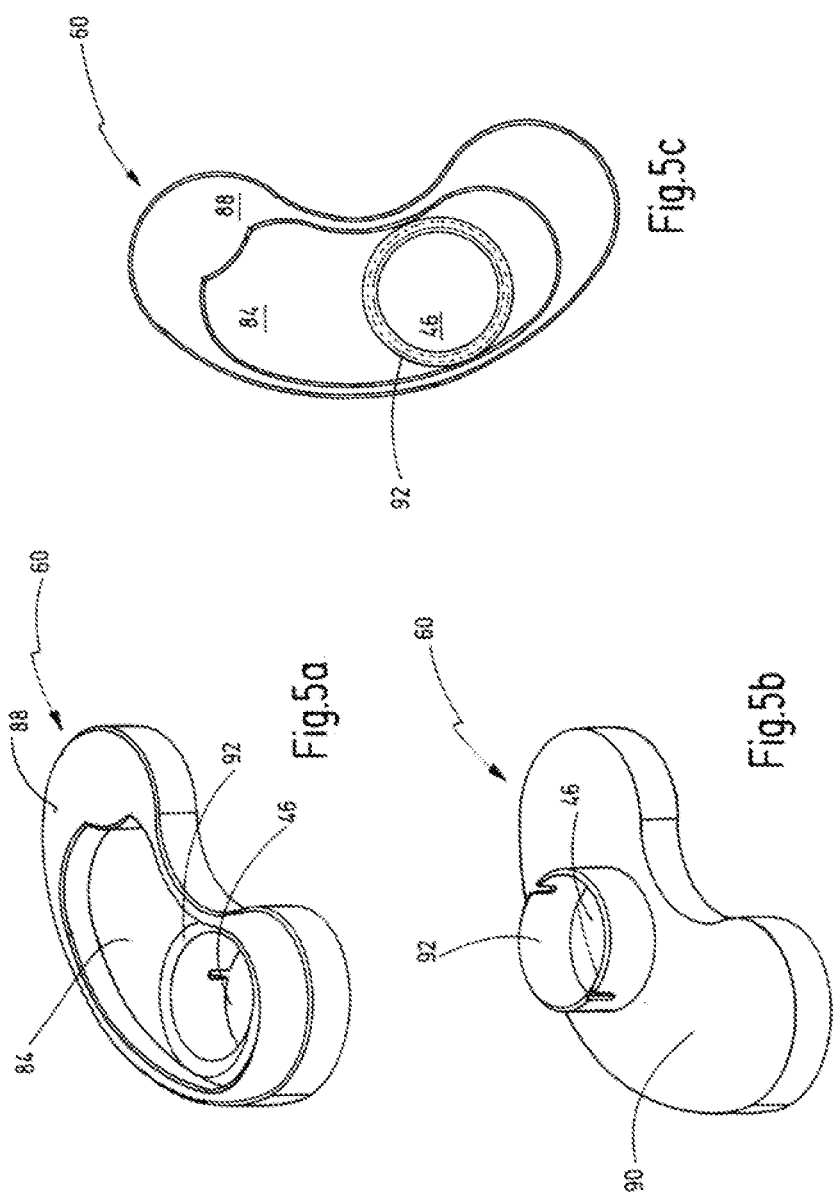

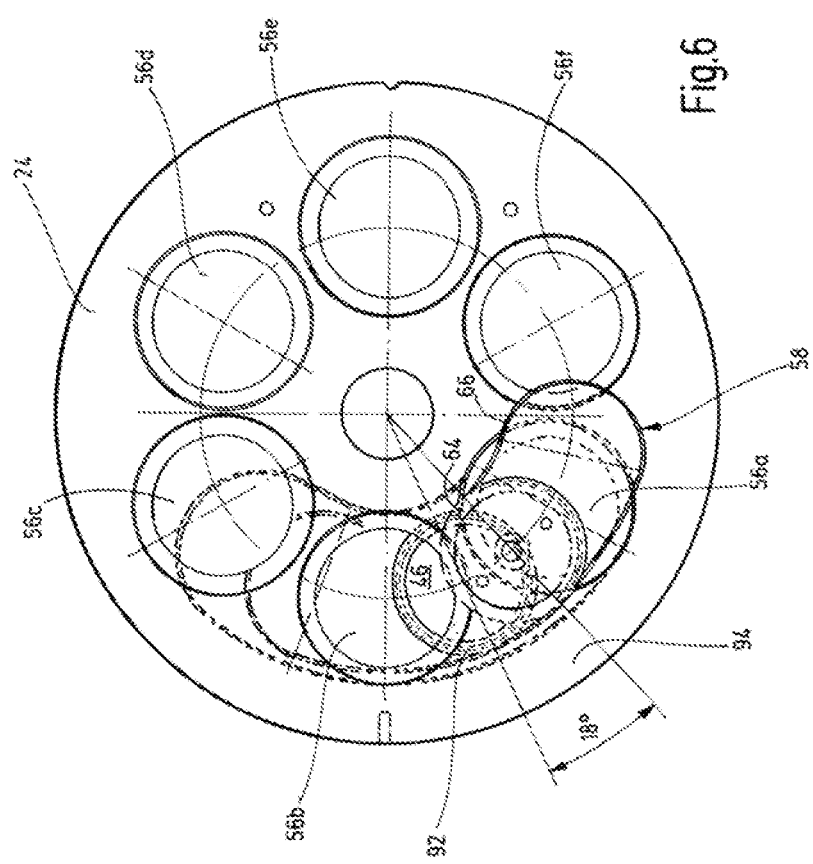

FILTER APPARATUS

FIELD OF THE INVENTION

The invention relates to a filter apparatus having a plurality of filter elements, which can be received in a filter housing having a filter inlet for a fluid to be filtered and a filter outlet for the filtered fluid. The filter elements can be traversed, via the element casing thereof, by a flow in both directions for filtration or backwashing. The filter elements each have an upper element opening and a lower element opening on their two opposite ends. During operation, at least one filter element simultaneously filters and at least one other element can simultaneously be backwashed in order to clean its effective filter surface by a backwash device. The backwash device, for supporting the backwashing, interacts with a pressure control device that has at least one pressure control element by which the fluid flow along the filter element to be cleaned is controllable during a backwashing process. The filter apparatus has a connection chamber, which is at least in part connected to the upper element opening of the filter cavity of the filter elements that forms the unfiltrate side. A fluid path is provided via which unfiltrate flows into the connection chamber during filtration. The passage of unfiltrate through the element opening associated with the filter element to be cleaned is controllable by the pressure control element. The backwash device with a discharge opening for the cleaning fluid can be moved under the lower element opening of the filter element to be backwashed.

BACKGROUND OF THE INVENTION

Such filter apparatuses are used in various kinds of industrial facilities and machines for cleaning the fluids such as process fluids, lubricants, and the like used therein. The efficiency of a filter apparatus is essentially defined by the filter elements and in particular the filter materials thereof. Stability, longevity, and effective removal of particulate contaminants from the filter materials and filter elements are the decisive criteria here. Many filter apparatuses are designed as backwash filters such that the individual filter elements can be continuously cleaned in succession by the backwash device in the ongoing filtration mode. In ballast water applications, for example, heavy contaminant loads can occur, which quickly clog the filter elements and the filter materials thereof to the extent that the filtration process is obstructed. Accordingly, the design of the backwash device and the pressure control device is chosen so as to bring about a best possible cleaning of the filter elements during backwashing in a reliable manner, even in the case of such heavy contaminant loads.

An example of a filter apparatus of the aforementioned type is disclosed in DE 10 2011 111 457 A1. In this prior art filter apparatus, the fluid frequently loaded with particulate contaminants and therefore to be filtered, or unfiltrate for the actual filtration process, flows via the filter inlet into the filter housing of the apparatus and flows through the filter elements from the inside to the outside. The fluid cleaned in this manner then exits the filter housing via the filter outlet arranged in the housing. During the flow through the filter elements from the inside to the outside, the particles to be separated from the fluid flow are deposited on the inside of the filter elements, and the cleaned fluid flow traverses the filter elements from the inside to the outside, seen in a radial direction. The filter elements are typically arranged in a space-saving manner in a circular form in the filter housing and have a predefinable filter fineness, which is adapted specifically to the size of the particles to be separated out.

For backwashing a filter element, a washing arm of the backwash device is swiveled, by a central drive provided for this purpose, under the lower opening of the filter element to be cleaned. The opening otherwise serves for supplying unfiltrate during the actual filtration process. The pressure gradient arising between the filter inlet and a backwash line, which connects to the washing arm and which can be opened and closed by a backwash fitting, typically in the form of a valve device, gives rise to a radial flow, this time from the outside to the inside, through the filter element. In the scope of backwashing, the particulate contamination deposited on the inside of the filter element is carried out of the filter apparatus by inflowing fluid originating from the clean side of the filter apparatus and via the backwash arm toward the backwash line when the fitting is open. During this backwashing process, the filtration mode is ensured with the remaining filter elements. After the conclusion of the backwashing process on this filter element, the backwash arm of the backwash device can be moved toward a filter element subsequent to this element, in order to clean the subsequent element of particulate contamination that arose in the scope of the preceding filtration.

The prior art filter apparatus furthermore has a pressure control device having a plurality of pressure control elements, each formed from a preferably pneumatically actuatable cut-off valve. The cut-off valve has a moveable valve body by which an assignable passage from the connection chamber through the upper element opening of a filter element is controllable. The valve body, interacting with the edge of the element opening on the cover plate, forms a type of plate valve. During the filtration process, the connection chamber itself is at least in part connected via the respective upper openings of the filter elements being used for filtration to the unfiltrate or inlet side of the filter apparatus via the lower element openings of these filter elements being used for filtration, which results in a continuous filling of the connection chamber with unfiltrate during the operation of the apparatus. Hence during the backwashing of the filter element concerned, not only does filtrate flow from the outside to the inside through the element, but unfiltrate is also continuously "suctioned" out of the connection chamber via the pressure gradient in the direction of the backwash line or dirt outlet of the filter apparatus when the plate valve is open. An intensified cross flow with unfiltrate from the connection chamber takes place essentially transversely to the cleaning fluid flowing in from the filtrate side of the filter apparatus, which significantly contributes to the removal of particulate contaminants on the inside of the filter element to be backwashed. As a result, a type of core flow is generated inside the filter element to be backwashed, which flow is fed mainly from the connection chamber configured as a reservoir and supported by an open-jet effect. In addition filtrate flows from the filtrate side of the apparatus into the interior of the filter element to be cleaned. This process constitutes a first phase of backwashing, in which the particulate contamination is dislodged.

If during the backwashing process the upper element opening is then closed by actuating the associated plate valve, thus abruptly closing the passage between the connection chamber and the interior of the filter element, a pulse pressure surge is generated in the fluid column remaining in the interior of the backwashed filter element. In the scope of backwashing, the pulse pressure surge "blasts loose" any particles remaining on the filter element or filter element material, and conveys them to the outlet of the filter apparatus. This blast considerably accelerates and improves the cleaning processes. This process constitutes the second phase of backwashing in the form of the actual dirt discharge. Closing the connection chamber or reservoir causes the fluid column already in motion to suction fluid from the filtrate side of the apparatus because no more fluid can flow from the connection chamber through the upper element opening closed by the pressure control element. In this manner the filter elements, which are preferably configured as tapered, particularly preferably as slotted sieve tubes, are cleaned of particles without leaving any residue. The dirt discharge continues via the discharge opening when the backwash line is open. When cleaning is finished, the associated plate valve opens and the washing arm swivels under the next filter element to be cleaned so that the backwashing process can be repeated for the subsequent filter element. The backwash fitting in the form of the valve device closes at the end of the backwash cycle.

SUMMARY OF THE INVENTION

Based on this prior art, the invention addresses the problem of maintaining this highly effective and technically reliable filtration and backwashing process, while simultaneously improving the same so as to achieve a simplified actuation concept for the backwash process.

This problem is basically solved by a filter apparatus where the pressure control device has at least one control plate, which, arranged inside the connection chamber, laterally passes over the individual upper element openings of the respective filter elements to be backwashed in a predefinable sequence. The pressure control device covers the openings to an increasing degree, and then exposes the openings again. The discharge opening of the backwash device is still at least in part fluidically connected to the lower element opening of the filter element to be backwashed, as the pressure control device moves toward the upper element opening.

With the at least one control plate, which is arranged movably in a circulating manner with lateral movement direction inside the connection chamber, it is possible to dispense with individual control or valve parts in the form of plate valves associated with the respective elements and movable in a vertical direction. Accordingly, the control plate passes in a timely manner and without delay over the upper element openings of the individual filter elements, and thus, interrupts the fluid connection of the connection chamber to the filter cavity in the interior of the filter element. This interruption triggers the pulse pressure surge for the particle removal and the open jet effect. Because the control plate revolves continuously during the operation of the filter apparatus, a continuous cleaning operation is then achieved in the backwash mode. The control plate is dimensioned in such a way that at least one element opening can be completely covered, although it is also conceivable to cover two or more element openings at least in part, but simultaneously, by the control plate. Because considerably fewer components have to be moved and actuated, the expenditure in terms of cost and maintenance is reduced, and the reliability in terms of operation and functioning is increased.

According to the invention, the efficacy of the backwashing of the filter elements is also improved in that the backwash device comprising a washing arm with a discharge opening operatively runs ahead of the control plate to further enhance the tangential cross flow inside the filter element to be backwashed in the scope of particle removal, in particular when inducing backwashing in a time- or pressure-controlled manner. By a predefinable spatial offset of the pressure control device relative to the backwash device and the resulting ratio of the at least in part different coverage areas of the upper element opening to the assignable lower element opening of the filter element to be cleaned, the flow pattern for the backwashing process can be set in accordance with the degree of cleaning required. In the scope of the backwashing processes for particle removal, the spatial or angular offset of the pressure control device and the backwash device with respect to a common drive or rotating shaft to be chosen is preferably about 18°.

The number and arrangement of the employed control plates and discharge openings, which are each arranged revolvably in equal orbits about the common drive shaft, depends upon the number and arrangement (e.g., along one or a plurality of concentric circle lines) of the filter elements in the filter housing. The rotational movement of the pressure control device on the upper element openings and of the backwash device on the lower element openings are particularly preferably coupled to each other. For example, both devices are fixed on the common drive shaft, thus achieving a simple construction of the filter apparatus and a high level of operational reliability and efficacy of the backwashing of the filter elements. For backwashing, both devices are rotated under or over the individual filter elements or element openings thereof, respectively, and clean these elements in sequence in the scope of backwashing.

In a preferred embodiment of the filter apparatus according to the invention, in order to achieve the offset, the backwash device has an enlarged collection chamber with the discharge opening, which is already at least in part fluidically connected to the next filter element in the backwashing sequence via the lower element opening thereof. The control plate of the control device is still laterally passing over the upper element opening of the preceding filter element in the sequence. In this manner, the backwashing process is prolonged for each subsequent or next filter element in the sequence because the backwashing of the next filter element in the sequence has already been initiated via the common collection chamber of the backwash device, before the conclusion of the backwashing of the one filter element, by using the control plate. In this process, the two devices preferably pass completely and essentially without any spacing over the assignable element openings in the sequence.

The collection chamber is preferably formed by a kidney-shaped enlarged recess or milled groove of a preferably plate-shaped (i.e., cover plate-shaped) backwash unit of the backwash device which. Owing to the recess size, it covers more than just one lower element opening of directly adjacent filter elements along the circle line. In this manner it is ensured that, with the solution according to the invention, fluid can be at least temporarily discharged as backwash fluid to the outside from two or optionally more filter elements via the backwash arm. As already explained, the filter elements are arranged along one or a plurality of concentric circle lines, and the pressure control device and the backwash device are guided in uniform rotational movement along the upper and lower element openings. The duration of the backwashing can be controlled via the number of revolutions or also via a predetermined time period. Typical rotation speeds for a filter apparatus according to the invention are values in the range of, for example, two to three seconds per revolution. In a view of the apparatus from above, the sense of rotation of the two devices is clockwise.

In another preferred embodiment of the filter apparatus according to the invention, the collection chamber of the backwash device is formed from a recess in the cover plate. The cover plate serves as a backwash unit and is guided by a backwash arm into which the discharge opening leads. The opening preferably is fluidically connected via the backwash arm to the valve control device of the backwash fitting. By virtue of the valve control unit arranged outside the filter housing and in combination with the pressure control device, particle removal can be further improved during backwashing, in particular if the valve control device is followed by a relatively long line section, which leads to an increased pressure gradient after the pressure control device, thereby further contributing to the detachment of particles from the filter element.

Another advantage is that the extension of the collection chamber is selected in such a way that two lower element openings of two adjacent filter elements are completely covered, at least in a swivel position of the backwash arm. In this manner, a particularly effective backwashing of the filter element to be backwashed is achieved in the continuous filtration mode with the other filter elements of the filter apparatus. The backwash arm is preferably rigidly connected via a shaft to the control plate above the filter elements. Both are driven simultaneously and at the same, relatively high speed by a motor as the common central drive, preferably by a gear motor.

In another preferred embodiment of the filter apparatus according to the invention, the pressure control device and the backwash device have the common drive, which moves the control plate and the cover plate with a constant spatial offset (18°) via rigid drive elements. As an alternative, the pressure control device and the backwash device are arranged stationarily inside the filter housing and the filter elements can be moved in carousel fashion under the devices by the common drive. The rotational movement of the pressure control device and the backwash device relative to the respective filter elements permits a compact construction of the filter apparatus as a whole in a common filter housing.

In another preferred embodiment of the filter apparatus according to the invention, the upper and lower element openings of each filter element are arranged in intermediate bottoms inside the filter housing. The passage openings of the intermediate bottoms are formed by the element openings themselves. The intermediate bottoms subdivide the filter housing into the unfiltrate-conducting connection chamber arranged above the filter elements, a filter element-receiving filtration chamber, which conducts filtrate, and a subchamber arranged underneath the filter elements, which conducts unfiltrate like the connection chamber. The intermediate bottoms, which extend in a planar manner, furthermore fix the filter elements in position inside the filter apparatus and provide a secure displacement guide for the two devices, which are each moved by the central drive in such a way that they can be driven with their control and cover plates along the intermediate bottom, above or below and under engagement with the same, respectively.

Another advantage is that the control plate of the pressure control device and the cover plate of the backwash device laterally pass over the intermediate bottom with the element openings with essentially no spacing. This gives rise to throttle effects during the fluid passage as the free cross sections of the element openings are controlled, which contributes to the triggering of the pressure surge during particle removal.

In a preferred embodiment of the invention, the cover plate laterally delimits the collection chamber with overhangs of predefinable length as part of the intended dimensioning, particularly when viewed in the direction of displacement, and abuts slidingly with the intermediate bottom with the lower element openings of the filter elements. An improved sealing of the collection chamber is then achieved with respect to the unfiltrate chamber underneath the intermediate bottom on which the filter elements are vertically disposed.

In another preferred embodiment of the filter apparatus according to the invention, the duration of the backwashing is controlled via the number of revolutions with the common drive or via a predefined backwash time. The pressure control device and the backflush device are then moved at constant speed in order to ensure continuous cleaning of the filter elements in the backwash process. Furthermore, the backwash process can be triggered by the detection of a differential pressure on the filter elements as they become increasingly contaminated with particulate matter.

The individual filter elements are preferably configured as tapered. The tapered configuration of the filter elements with diameters that decrease from the lower end to the upper end increases the filtration performance of the filter element traversed by a flow from the inside to the outside. In conjunction with the aforementioned core flow effect in the interior of the filter element to be backwashed or cleaned, this furthermore gives rise to an improved particle removal during the backwashing phase with the subsequent pressure surge. All of the filter elements of the filter apparatus are preferably configured the same. However, arranging filter elements having different designs and different dimensions, e.g., different diameters, next to one another in the filter housing is also conceivable. A wire mesh is preferably used as a filter material. A sintered wire mesh or coated filter materials are also conceivable. Furthermore, so-called slotted sieve tubes with and without filter materials and preferably made of stainless steel materials can be used for the filter elements.

The aforementioned features and the ones mentioned in the following can each be inventively realized individually or in any combination on a filter apparatus according to the invention. Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are schematic and not to scale:

FIGS. 3a and 3d are a top perspective view and a bottom perspective view, respectively, of the control plate of the pressure control device shown in FIG. 2;

FIG. 3b is a top plan view of the control plate according to FIG. 3a;

FIG. 3c is a side view in section of the control plate take along the line A-A in FIG. 3b;

FIGS. 4a and 4b are bottom and top perspective views, respectively, of the backwash device of the filter apparatus shown in FIGS. 1a and 1 b;

FIGS. 5a, b and c are a top perspective view, a bottom perspective view and a top plan view, respectively, of the cover plate of the backwash device shown in FIGS. 4a and 4b; and FIG. 6 a notionally superimposed top plan view with a lower intermediate bottom of the filter apparatus from FIGS. 1a and 1b, illustrating the spatial offset between the pressure control device and the backwash device.

DETAILED DESCRIPTION OF THE INVENTION

Figure 1A:
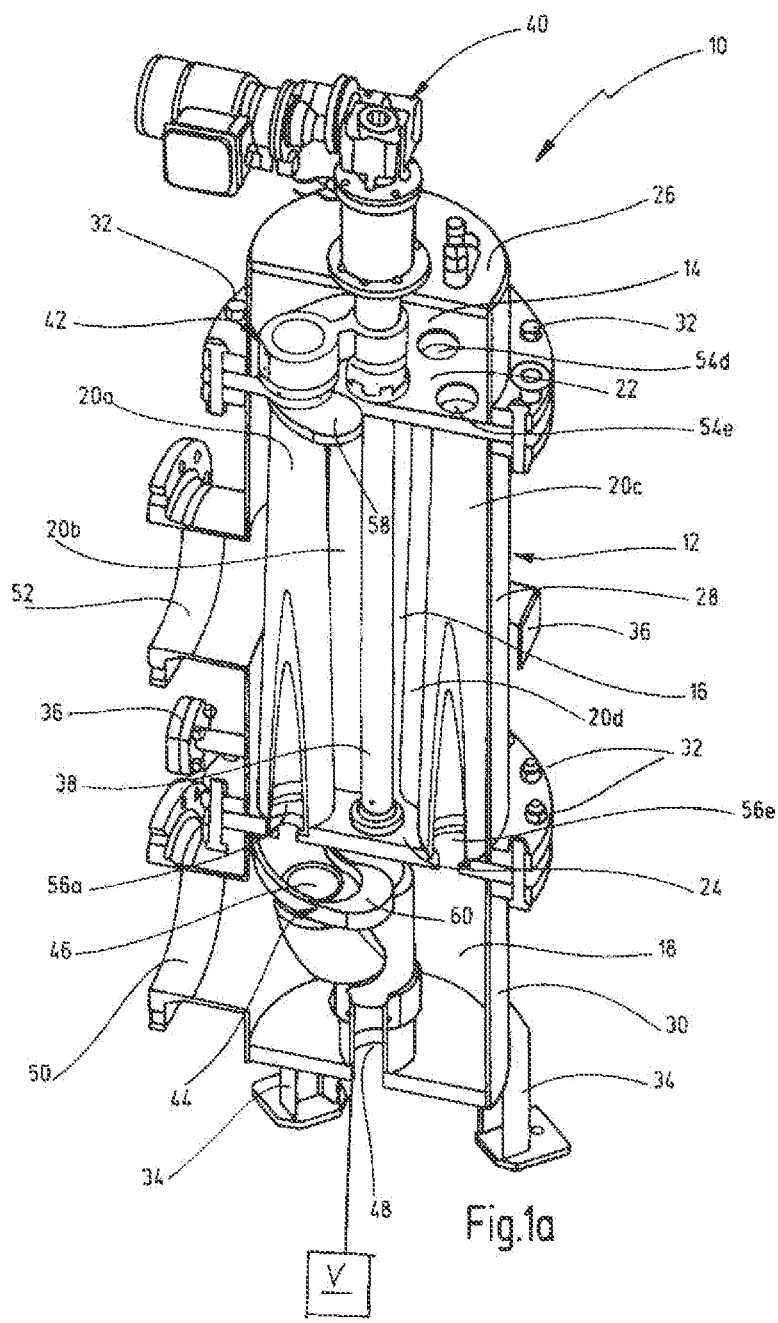
FIGS. 1a and 1b are perspective views in section of a filter apparatus according to an exemplary embodiment of the invention, having an offset between the positions of the pressure control device and the backwash device.
Figure 1B:
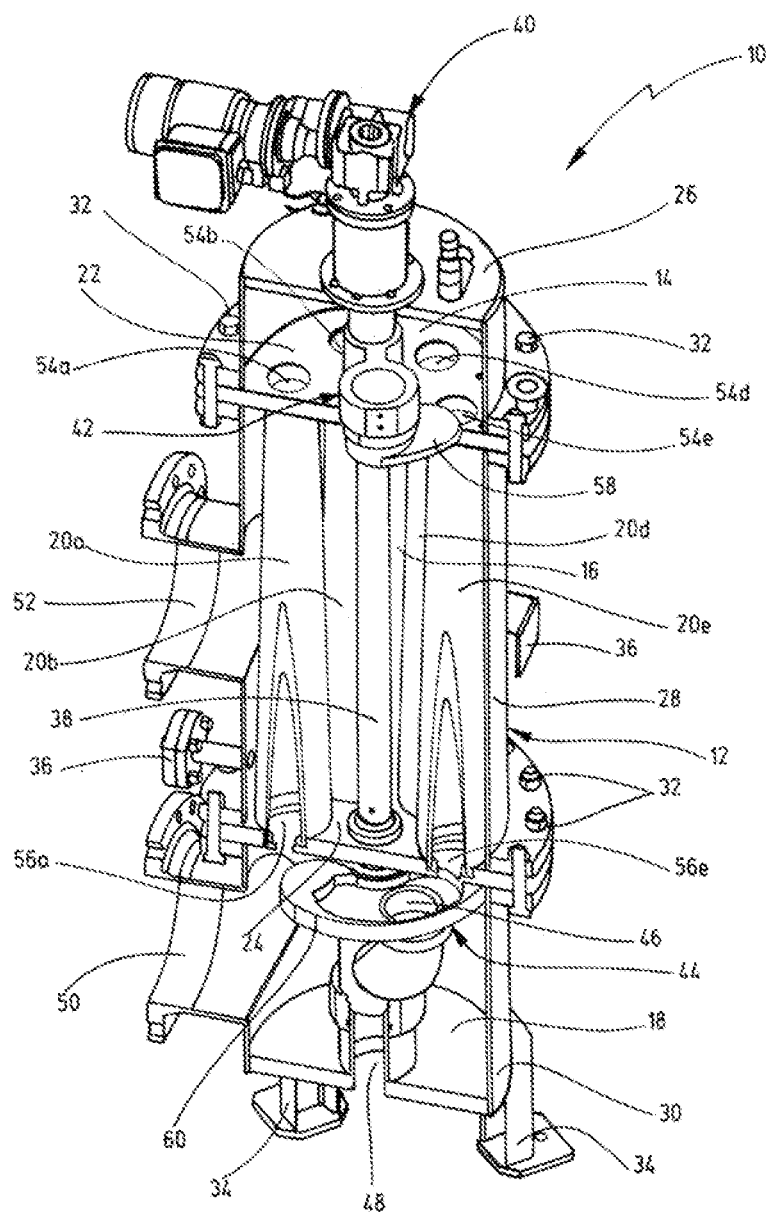

FIGS. 1a and 1b show, in perspective and partial section in each case, a filter apparatus 10 having a cylindrical filter housing 12, which is subdivided into a connection chamber 14, a filtration chamber 16, and an intermediate chamber 18. Six filter elements in total are arranged in the filtration chamber 16, of which only four elements 20a, b, d and e are shown. The filter elements 20, which are illustrated in a partially cutaway view, are each configured as tapered, with diameters that decrease from the lower end to the upper end. The filter elements 20 are arranged on a circle line in a uniform and rotationally symmetric manner with respect to the symmetry axis or longitudinal axis of the filter housing 12. The individual filter elements 20 are each inserted by their upper and lower ends 54, 56, respectively, in a first intermediate bottom 22, which separates the connection chamber 14 from the filtration chamber 16, and in a second intermediate bottom 24, which separates the filtration chamber 16 from the intermediate chamber 18, where they are arranged vertically and held.

The filter housing 12 comprises an upper housing part 26 with the connection chamber 14, a middle housing part 28 with the filtration chamber 16, and a lower housing part 30 with the intermediate chamber 18. The housing parts 26, 28 and 30 are detachably connected to one another by individual ring flanges. The intermediate bottom 22 or 24 is held sandwich-manner and crossways in the composite formed from the ring flanges. Each composite of ring flanges with the intermediate bottoms 22, 24 fixed in between is firmly connected together by a plurality of screw fastening elements 32. Foot base parts 34, with which the filter apparatus 10 can be mounted upright on a bottom surface, not shown in any further detail, are provided on the lower housing part 30.

The filter apparatus 10 is part of a processing unit that is not shown in any further detail. The filter apparatus 10 can also be connected to a central control (not shown) of the processing unit via a connection and actuation part 36 arranged laterally on the middle housing part 28. A drive shaft 38, which can be driven by a central drive 40 in the form of an electric motor or pneumatic drive fastened on the cover of the upper housing part 26, is arranged along the longitudinal axis of the filter housing 12. A pressure control device 42 and a backwash device 44 are present, are rigidly connected to the drive shaft 38 and can be rotated via the drive 40. The pressure control device 42 is arranged in the connection chamber 14 above the filter elements 20. The backwash device 44 is arranged in the intermediate chamber 18 below the filter elements 20. Via a discharge opening 46, a fluid connection is established to an only partially depicted backwash line 48. Backwash line 48 extends in a vertical direction along the longitudinal axis of the filter housing 12 and connects to the backwash device 44. A backwash fitting, particularly in the form of an actuatable valve device V, connects to the backwash line 48 and outside the filter apparatus 10. As mentioned in the preceding with regard to the prior art, this backwash fitting supports the backwash function.

A filter inlet 50 for unfiltrate, aligned horizontally on the lower housing part 30, is arranged on the filter housing 12. A filter outlet 52 for filtrate is arranged in comparable fashion on the middle housing part 28. The upper element openings 54a to 54f (see FIG. 2) of the filter elements 20 each constitute a passage opening through the first intermediate bottom 22 forming a fluid connection between the connection chamber 14 and the interior filter cavity of the filter element 20 concerned. In corresponding fashion, lower element openings 56a to 56f (see FIG. 6) of the filter elements 20 constitute through-openings through the second intermediate bottom 24 forming a fluid connection between the intermediate chamber 18 and the interior filter cavity of the filter element 20 concerned.

When the filter apparatus 10 is used for cleaning a fluid, the uncleaned fluid is conducted as unfiltrate into the filter housing 12 at the filter inlet 50, flows from the intermediate chamber 18 through five of the six lower element openings 56 to the filter cavity of the filter element 20 concerned, and is cleaned as it flows from inside to the outside through five of the six filter elements 20. One of the six elements 20 is not available for filtration because it is being backwashed. From the filtration chamber 16 of the filter housing 12, the cleaned fluid is discharged as filtrate from the filter apparatus 10 via the filter outlet 52. A portion of the fluid flowing through the five filter elements 20 remains partly uncleaned and flows into the connection chamber 14 through the upper element openings 54. The filter elements 20 with their filter materials then form the boundary between the dirty side, with unfiltrate in the intermediate chamber 18, in the connection chamber 14 and in the filter cavity of the filter element 20 used for filtration, and the clean side, with filtrate in the fluid chamber surrounding the filter elements 20 on the outside, which forms the filtration chamber 16 inside the filter apparatus 10.

In order to remove particles deposited on the filter material and/or in the interstices of the slotted tube during filtration, the backwash device 44 is moved by motor via the drive 40 under the filter element 20 to be cleaned. The fluid path of the unfiltrate from the intermediate chamber 18 into the filter cavity of the filter element 20 concerned is interrupted. Unfiltrate flows simultaneously from the connection chamber 14 serving as a reservoir into the associated inner filter cavity and, along with the removed particles, reaches the backwash line 48 via the associated lower element opening 56 and the discharge opening 46 of the backwash device 44. The fluid used for backwashing plus the contaminant load is then discharged from the filter apparatus 10 via the backwash line 48. The cross flow from the connection chamber 14 through the filter cavity of the filter element 20 concerned to the backwash line 48 is interrupted by the closure of the associated upper element opening 54 by the pressure control device 42. As a result of the corresponding flow separation, the inflow of fluid or filtrate from the clean side in the filtration chamber 16 into the interior of the filter element 20 concerned is intensified, and dirt particles are removed from the filter material in pulses. Prior to this, with the backwash fitting opened, the backwashing is enhanced by the pressure gradient between the filter inlet 50 and the inflowing unfiltrate and the backwash line 48, which serves to discharge dirty fluid with the removed particles from the device 10.

In order to ensure proper closure of the respective upper element openings 54a to 54f, and the lower element openings 56a to 56f, a control plate 58 is provided on the pressure control device 42 and a cover plate 60 is provided on the backwash device 44. The control plate 58 rests on the upper side of the first intermediate bottom 22. The cover plate 60 abuts on the underside of the second intermediate bottom 24 in comparable fashion. Both plates 58, 60 have a reniform basic shape, which at least in part covers at least two element openings 54a to 54f, 56a to 56f in the respective intermediate bottoms 22, 24. However, the degree of coverage of the free flow cross sections of adjacent element openings along the circle line is considerably greater in the case of the cover plate 60 than in the case of the control plate 58.

The pressure control device 42 and the backwash device 44 are rigidly connected to the drive shaft 38 and are guided via the drive 40 in corresponding rotational movements above and below the filter elements 20, respectively. In the position shown in FIG. 1a, both devices 42, 44 are arranged in the area of the filter element 20a and of an adjacent filter element 20f preceding filter element in the rotational direction. Filter element 20f not shown in FIG. 1a. In contrast, the position of the devices 42, 44 shown in FIG. 1b is shifted by ca. 100° in the counterclockwise direction. Accordingly, the element openings 54f as well as 56f and 56e of the filter element 20f as well as those of another adjacent, leading filter element 20e are covered, at least in part, by the plates 58 and 60, respectively. The devices 42, 44 initially assume a position according to the illustration of FIG. 1b before they are moved by a rotation in the clockwise direction (in a view of the device 10 from above) to a position according to FIG. 1a. The change in position, with respect to the individual filter elements 20, thus takes place continuously in the clockwise direction as viewed from the top of device 10.

For backwashing one of the individual filter elements 20a to 20f simultaneously with the filtration mode, the pressure control device 42 and the backwash device 44 are moved clockwise at constant speed by the drive 40. The upper element openings 54a to 54f and the lower element openings 56a to 56f are covered and then exposed again in succession by the control plate 58 and the cover plate 60, respectively. From the illustrations according to FIG. 1a, b, it can readily be discerned that in the scope of backwashing, the cover plate 60 of the backwash device 44 "runs ahead" of the control plate 58 of the pressure control device 42, i.e., starts the backwashing for the filter element 20a before the control plate 58, exposing the upper opening 54f, passes over the subsequent upper element opening 54a of the element 20a, triggering the pressure pulse.

Figure 2:
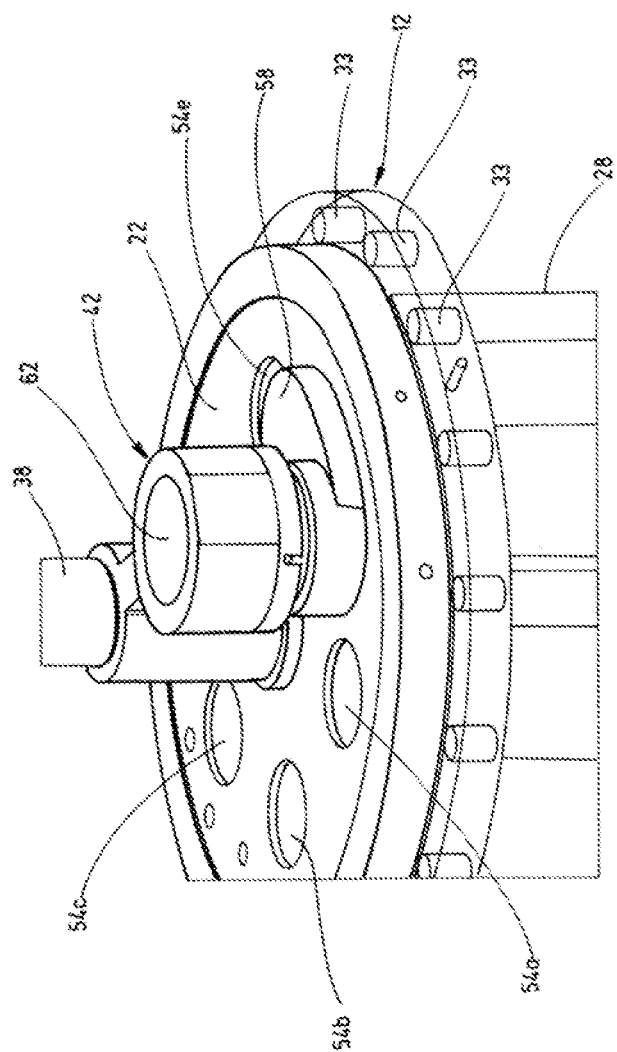
FIG. 2 is a partial perspective view of the filter apparatus from FIGS. 1a and 1b illustrating the design and workings of the pressure control device.

FIG. 2 shows an enlarged subsection of the filter apparatus and illustrates the design of the pressure control device 42. The control plate 58 is rigidly connected to the drive shaft 38 via a swivel part 62. The control plate 58 resting or abutting on the first intermediate bottom 22 is connected on its upper side to the swivel part 62 and moveably guided therewith. The four upper element openings 54a to 54d formed in the first intermediate bottom 22 are completely exposed in the illustration of FIG. 2, whereas the fifth element opening 54e is only in part covered by the control plate 58 and the sixth element opening 54f is completely covered by the control plate 58. At the edge of the first intermediate bottom 22, through-openings 33 are provided for the screw fastening elements 32 (see FIGS. 1a and 1b for comparison) for fastening the middle housing part 28 and the upper housing part 26 (see FIGS. 1a and 1b for comparison) of the filter housing 12 to the intermediate bottom 22.

FIGS. 3a to 3d show the detailed design of the control plate 58, by which individual upper element openings 54a to 54f (see the preceding figures for comparison), which open on the upper side of the first intermediate bottom 22, are covered in sequence during the backwashing process. The perspective illustration according to FIG. 3b shows that the control plate 58 has a discoid fastening part 64 and a plate part 66 projecting downwards in one piece thereon. Two fastening options 68 for fastening the control plate 58 on the swivel part 62 (see FIG. 2 for comparison) are formed on the fastening part 64. Also provided on the fastening part 64 is a passage opening 70, which has a stepped profile and which is covered by the swivel part 62.

The plan view according to FIG. 3b of the upper side of the control plate 58 shows that the passage opening 70 is concentric to the center point of the circular fastening part 64. The two fastening holes 68 are arranged opposite one another, diametrically to the passage opening 70. The section of FIG. 3c through the control plate 58 shows that the passage opening 70 is widened in the area of the plate part 66.

A first edge 72 is provided on the fastening part 64. A second edge 74, which is narrower in width compared to the first edge 72, is provided circumferentially on the plate part 66. The perspective illustration of FIG. 3d shows a second edge 74', which circumferentially surrounds a control surface 76 on the underside of the control plate 58.

The second edge 74' facilitates a sliding and an in-part sealing abutment of the control surface 76 on the first intermediate bottom 22. The control plate 58 is furthermore reniform, as shown in the plan view according to FIG. 3b.

FIGS. 4a and 4b each show the design of the backwash device 44 in perspective view, wherein a perspective from below is chosen in FIG. 4a and a perspective from above is chosen in FIG. 4b. The backwash device 44 comprises an arch-shaped backwash arm 78, which attaches to a hollow cylindrical pipe section 80. The cover plate 60, which is firmly held in position by a clamping part 82, is arranged on the upper end of the backwash arm 78. In order to enable a simultaneous discharge of washing fluids from several, preferably two filter elements 20 (see FIGS. 1a, 1b, 2 for comparison). A recess 84 is provided on the upper side, associated with the second intermediate bottom 24, of the cover plate 60. The recess 84 extends over about ⅔ of the entire cover plate 60 and encloses, on its bottom side, the circular discharge opening 46. In the installed state of the backwash device 44, the pipe section 80 is arranged along the longitudinal axis of the filter housing 12 and forms the connection to the backwash line 48. For arranging the backwash device 44 in the filter apparatus 10 in a positionally-fixed manner, a connection pipe 86 is provided on the upper end of the pipe section 80 and is firmly connected to the drive shaft 38 of the drive 40.

FIGS. 5a to 5d illustrate the design of the cover plate 60. FIG. 5a shows a planarly extending cover side 88 of the cover plate 60. FIG. 5b shows a planarly extending underside 90 of the cover plate 60. A recess 84, on the bottom side of which the discharge opening 46 is provided, is formed on the cover side 88. The discharge opening 46 is surrounded by a circular attachment piece 92 that juts out vertically on the underside 90 of the cover plate 60 for attaching cover plate 60 to backwash arm 78.

The plan view of the upper side or cover side of the cover plate 60 in FIG. 5c shows that the circular attachment piece 92 and the reniform recess 84 are formed and arranged in different planes in the reniform cover plate 60. Since the cover plate 60 runs ahead of the control plate 58 in terms of the covering function in the continuous backwash mode, the part of the cover plate 60 with the recess 84 that is situated before the discharge opening 46 in the travel direction (in the clockwise direction in the exemplary embodiment shown) is larger. In addition, a circular segment-shaped indentation, which corresponds to the circular shape of one of the lower element openings 56a to 56f to be covered by the cover plate 60, is provided on the front end (upper end shown in FIGS. 5a, c) of the recess 84.

The unique feature of the pressure control device 42 and the backwash device 44 formed on the filter apparatus 10 is a simultaneous backwashing of several (two in the exemplary embodiment shown) adjacent filter elements 20a to 20f. This is achieved by both devices 42, 44 being connected to one another for conjoint rotation and being moved with one another in sequence along the individual filter elements 20a to 20f via the drive shaft 38. The view from above shown in FIG. 6 of the second intermediate bottom 24 with the lower element openings 56a to 56f illustrates that the cover plate 60 and the control plate 58, which are superimposed over one another in an imaginary representation, have a spatial offset relative to each other. The circular fastening part 64, which attaches to the plate part 66 of the control plate 58, lines up with the attachment piece 92, surrounding the discharge opening 46, of the cover plate 60 in an angular range of 18°, starting from the center axis or longitudinal axis of the filter apparatus 10. The corresponding coverage area is designated with 94.

In the position of the pressure control device 42 and the backwash device 44 shown in FIG. 6, the control plate 58 completely covers the upper element opening 54a (see FIGS. 1a, 1b, 2 for comparison) associated with the lower element opening 56a. In contrast, the cover plate 60 covers the two adjacent lower element openings 56a and 56b with its recess 84 and in this manner simultaneously drains washing fluid from the associated filter elements 20a, 20b. The cover plate 60, with its part that juts above the recess 84, comes increasingly into the area of the subsequent lower element opening 56c such that with a further clockwise rotation of the backwash device 44, the recess 84 is rotated under the free cross section of the lower element opening 56c and in this manner initiates the backwashing process in the filter element 20c. At this point in time then, the control plate 58 has completely passed over the upper element opening 54a and has triggered the pressure pulse for the element 20a before the plate 58 is advanced to the subsequent element 20b.

Once the control plate 58 exposes the associated upper element opening 54a, the corresponding backwash process is completely ended within one revolution. With the other filter elements 20, the undersides of which are not covered by the cover plate 60, the filtration is continued with the liquid unfiltrate supplied to the filter apparatus 10.

While one embodiment has been chosen to illustrate the invention, it will be understood by those skilled in the art that various changes and modifications can be made therein without departing from the scope of the invention as defined in the claims.

The invention claimed is:

1. A filter apparatus, comprising:
   a filter housing having a filter inlet for fluid to be filtered and a filter outlet for filtered fluid;
   a plurality of filter elements in the filter housing traversable for fluid in one direction for filtration and in an opposite direction for backwashing, each of the filter elements having an upper element opening and a lower element opening on opposite ends of each of the filter elements, the filter elements being arranged in the filter housing such that at least one of the filter elements filters fluid from the filter inlet while at least one other of the filter elements is simultaneously backwashed to clean a dirty filter surface thereof;
   a backwash device in the filter housing backwashing the filter elements;
   a pressure control device interacting with the backwash device and having a pressure control element controlling fluid flow along the filter elements during backwashing thereof;
   a housing connection chamber in the filter housing connected in fluid communication to filter cavities forming an unfiltrate side of the filter elements via the upper element openings providing a fluid path via which unfiltrate flows into the housing connection chamber during filtration and flows from the housing connection chamber through a respective upper element opening into a respective filter cavity during backwashing with unfiltrate flow through the respective upper element opening being controlled by the pressure control element;
   a discharge opening of the backwash device in fluid communication with the respective filter cavity via a respective lower element opening during backwashing;
   a control plate of the pressure control device being arranged inside the housing connection chamber, being laterally movable to pass over the upper element openings individually of filter elements being backwashed in a predeterminable sequence, covering the upper element openings to an increasing degree and then exposing the upper element openings again, the discharge opening being at least partially in fluid communication to the lower element opening of a respective filter element being backwashed as the pressure control element moves toward the respective upper element opening of the respective filter element being backwashed;
   a reniform recess in a reniform cover plate of the backwash device forming a backwash collection chamber of the backwash device, the reniform cover plate being guided for movement by a backwash arm extending from the discharge opening, the discharge opening being connectable in fluid communication to a valve via the backwash arm; and
   a cylindrical attachment piece on the reniform cover plate with the reniform recess and the cylindrical attachment piece being arranged in different planes in the reniform cover plate and with the cylindrical attachment piece attaching the reniform cover plate to the backwash arm.

2. A filter apparatus according to claim 1 wherein
when the discharge opening is connected in fluid communication with the lower element opening of the respective filter element being backwashed, the discharge opening also being connected in fluid communication with the lower element opening of a respective filter element next in a backwashing sequence of the filter elements as the control plate of the pressure control device is still laterally passing over the upper element opening of a respective filter element of a preceding one of the filter elements in the backwashing sequence.

3. A filter apparatus according to claim 1 wherein
an extension of the reniform recess of the backwash collection chamber completely covers both of the lower element openings of two adjacent ones of the filter elements in a swivel position of the backwash arm.

4. A filter apparatus according to claim 1 wherein
the pressure control device and the backwash device are connected to a common drive that drive the control plate and the reniform cover plate with a constant angular spatial offset via rigid drive elements.

5. A filter apparatus according to claim 1 wherein
the upper and lower element openings of the filter elements are arranged inside the filter housing in first and second intermediate bottoms, respectively, passage openings of the intermediate bottoms being formed by the upper and lower element openings.

6. A filter apparatus according to claim 5 wherein
the control plate and the reniform cover plate laterally pass over the first and second intermediate bottoms, respectively, essentially without spacing therebetween.

7. A filter apparatus according to claim 5 wherein
the reniform cover plate laterally delimits the backwash collection chamber with overhangs of a predefinable length in a direction of movement thereof, the overhangs being abutable with the second intermediate bottom and the lower element openings of the filter elements.

8. A filter apparatus according to claim 1 wherein
durations of the backwashing of the filter elements being controllable via at least one of a number of revolutions of a common drive or a predefined backwash time.

9. A filter apparatus according to claim 1 wherein
the filter elements are tapered.

* * * * *